L. L. KNIGHT.
Hay Spreader.
No. 53,739.
Patented April 3, 1866.
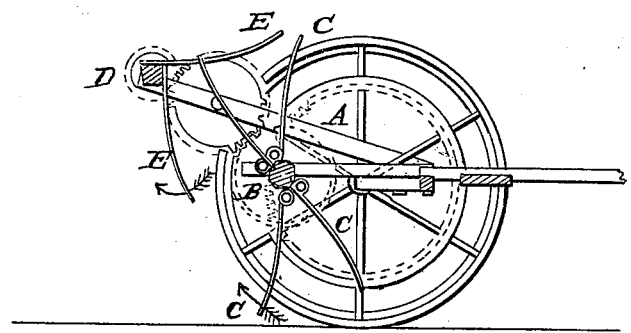
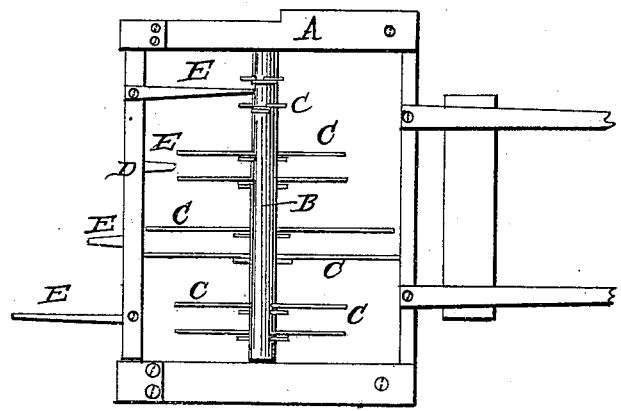
Witnesses
Sherman R. Nye
D. B. Makepeace
Inventor
Luke L. Knight
J. E. Taylor Agent

United States Patent Office.

LUKE L. KNIGHT, OF BARRE, ASSIGNOR TO J. E. TAYLOR, OF SUTTON, MASSACHUSETTS.

IMPROVEMENT IN HAY-SPREADERS.

Specification forming part of Letters Patent No. 53,739, dated April 3, 1866.

*To all whom it may concern:*

Be it known that I, LUKE L. KNIGHT, of Barre, in the county of Worcester and State of Massachusetts, have invented a new and useful Improvement in Machines for Making Hay, termed "Hay-Tedders;" and I do hereby declare that the following is a full, clear, and exact description of the construction and operation of the same, reference being had to the accompanying drawings, forming a part of this specification, in which—

Figure 1 represents a vertical longitudinal section, and Fig. 2 is a plan view.

Similar letters of reference indicate corresponding parts in the several figures.

This invention relates to an improvement in machines in making hay or for scattering the grass after it is cut, so as to thoroughly expose it to the action of the air and sun for drying and curing it previously to its being raked and gathered.

Attempts have been made to use a revolving cylinder or shaft for the purpose of turning and scattering the grass; but the liability of the latter to wind about the shaft and clog the teeth has rendered the use of such machines objectionable.

The object of my present invention is to obviate the difficulties attending the use of such machines, and to produce a machine which will thoroughly and expeditiously effect the object sought for; and the invention consists in the employment of a series of clearers upon a revolving shaft, in combination with a revolving toothed shaft, which is used for the purpose of raising or gathering the cut grass from the ground, the said clearers being arranged to pass between the elevating fingers or teeth in such a manner as to disengage the grass from the said fingers or teeth, and at the same time to assist in scattering and separating the same.

In the drawings, A represents a rectangular frame of any suitable size or construction, and mounted upon wheels.

B is a shaft extending across the frame and journaled in a bar at each side, the said bar being attached to the front part of the frame and extending back at an angle with the same on a line with the shafts, and resting upon the axle. Upon one end of the axle is fixed a cog-wheel, bearing upon its outer face a pinion, which gears with a toothed rim attached to the driving-wheel, by which motion is communicated, through a system of gearing, to the clearer-shaft upon the outer or rear end of the main frame. A similar system of gearing may be applied to the other side of the machine, if desired.

Upon the shaft B is secured a series of teeth or tines, C, arranged in couples, each couple being attached to the shaft so as to project from opposite sides of the same and in a line with each other. These teeth are slightly curved at their outer ends, and at their inner ends, near the shaft, are formed in a coil, in order to give them greater elasticity and admit of their yielding to any obstacles in their way.

At the rear end of the frame A is journaled a shaft, D, to which is secured a series of curved fingers or clearers, E, so arranged in relation to the fingers or tines C as that each one shall pass between two of the fingers C in such a manner that the grass, as it is carried up by the said fingers, will be immediately taken off and scattered upon the ground.

From this description it will be seen that as the machine is drawn forward the driving-wheel, by means of gear-connections, will impart a rapid rotary movement to the main shaft and its fingers in the direction shown by the arrows. At the same time the shaft D, with its clearers, is caused to rotate in an opposite direction, the said clearers passing between the fingers in such a manner as to completely remove the grass which has been gathered by the fingers on the main shaft, by which it is thoroughly separated and scattered.

I do not claim a revolving toothed shaft to raise the grass from the ground; but What I do claim, and desire to secure by Letters Patent, is—

The combination of the shaft D, provided with the clearers E, and the revolving shaft B, provided with the elevating fingers or tines C, as and for the purpose specified.

The above specification of my invention signed by me this 16th day of January, 1866.

LUKE L. KNIGHT.

Witnesses:
SHERMAN R. NYE,
D. B. MAKEPEACE.